(12) United States Patent
Mabuchi

(10) Patent No.: US 9,862,816 B2
(45) Date of Patent: *Jan. 9, 2018

(54) PNEUMATIC TIRE

(71) Applicant: SUMITOMO RUBBER INDUSTRIES, LTD., Kobe-shi (JP)

(72) Inventor: Takahiro Mabuchi, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/912,802

(22) PCT Filed: Aug. 25, 2014

(86) PCT No.: PCT/JP2014/072109
§ 371 (c)(1),
(2) Date: Feb. 18, 2016

(87) PCT Pub. No.: WO2015/037420
PCT Pub. Date: Mar. 19, 2015

(65) Prior Publication Data
US 2016/0194484 A1     Jul. 7, 2016

(30) Foreign Application Priority Data

Sep. 10, 2013 (JP) .................. 2013-187655

(51) Int. Cl.
| B60C 1/00 | (2006.01) |
| C08L 9/06 | (2006.01) |
| B60C 11/00 | (2006.01) |
| C08L 9/00 | (2006.01) |

(52) U.S. Cl.
CPC .................. C08L 9/06 (2013.01); B60C 1/00 (2013.01); B60C 1/0016 (2013.01); B60C 11/00 (2013.01); C08L 9/00 (2013.01); C08K 2201/006 (2013.01); C08L 2205/02 (2013.01); C08L 2205/035 (2013.01); C08L 2205/08 (2013.01)

(58) Field of Classification Search
CPC .................................. C08L 9/06; B60C 1/0016
See application file for complete search history.

(56) References Cited

U.S. PATENT DOCUMENTS

| 5,352,743 | A | 10/1994 | Coolbaugh et al. |
| 5,851,321 | A | 12/1998 | Midorikawa et al. |
| 7,411,018 | B2* | 8/2008 | Appel .................. B60C 1/0016 524/318 |
| 7,655,739 | B1 | 2/2010 | McPhee et al. |
| 7,759,444 | B1 | 7/2010 | McPhee |
| 2007/0078232 | A1 | 4/2007 | Yan |
| 2007/0149689 | A1 | 6/2007 | Wang et al. |
| 2008/0161452 | A1 | 7/2008 | York et al. |
| 2009/0105398 | A1* | 4/2009 | Hirabayashi .......... B60C 1/0016 524/506 |
| 2010/0056685 | A1 | 3/2010 | Hatori et al. |
| 2010/0056714 | A1 | 3/2010 | McPhee |
| 2010/0056743 | A1 | 3/2010 | McPhee |
| 2012/0259038 | A1 | 10/2012 | Kojima |
| 2014/0357824 | A1 | 4/2014 | Washizu |
| 2014/0155536 | A1 | 6/2014 | Kuwahara et al. |
| 2014/0213715 | A1 | 7/2014 | Kuwahara et al. |
| 2014/0296373 | A1* | 10/2014 | Mabuchi ............... B60C 1/0016 523/156 |
| 2014/0371415 | A1 | 12/2014 | Washizu |
| 2015/0031839 | A1 | 1/2015 | Washizu |
| 2015/0051332 | A1 | 2/2015 | Koda et al. |
| 2015/0057392 | A1* | 2/2015 | Koda ........................ B60C 1/00 523/156 |
| 2015/0057403 | A1* | 2/2015 | Koda ........................ B60C 1/00 524/493 |

FOREIGN PATENT DOCUMENTS

| EP | 1 069 160 A1 | 1/2001 |
| EP | 1 099 711 A2 | 5/2001 |
| EP | 2 014 709 B1 | 9/2009 |
| EP | 2 835 387 A1 | 2/2015 |
| JP | 2000-344955 A | 12/2000 |
| JP | 2003-64222 | 3/2003 |
| JP | 2011-94013 | 5/2011 |
| JP | 2012-502135 A | 1/2012 |
| JP | 2012-502136 A | 1/2012 |
| JP | 2014-88544 | 5/2014 |
| JP | 2014-208796 | 11/2014 |
| JP | 2014-218631 A | 11/2014 |
| WO | WO 2010/027463 A1 | 3/2010 |
| WO | WO 2010/027464 A1 | 3/2010 |
| WO | 2013/047347 A1 | 4/2013 |

(Continued)

OTHER PUBLICATIONS

International Search Report issued Oct. 28, 2014 in PCT/JP14/72109 dated Aug. 25, 2014.
Office Action dated Feb. 12, 2015 in U.S. Appl. No. 14/225,743.
Office Action dated Sep. 21, 2015 in U.S. Appl. No. 14/225,743.

(Continued)

Primary Examiner — Vickey Nerangis
(74) Attorney, Agent, or Firm — Oblon, McClelland, Maier & Neustadt, L.L.P.

(57) ABSTRACT

The present invention provides a pneumatic tire having high productivity and achieving a balanced improvement in fuel economy, rubber strength, abrasion resistance, wet-grip performance, and handling stability. The present invention relates to a pneumatic tire including a tread formed from a rubber composition, the rubber composition containing a rubber component in which, based on 100% by mass of the rubber component, the amount of a styrene-butadiene rubber is 15-90% by mass, the amount of a high-cis polybutadiene having a cis content of 95% by mass or more is 5-60% by mass, and the amount of a polyisoprene-based rubber is 0-70% by mass, the rubber composition containing, relative to 100 parts by mass of the rubber component, 10-150 parts by mass of a silica having a nitrogen adsorption specific surface area of 40-400 m$^2$/g, and 1-50 parts by mass of a farnesene resin obtained by polymerizing farnesene.

19 Claims, No Drawings

(56) References Cited

FOREIGN PATENT DOCUMENTS

| WO | 2013/047348 A1 | 4/2013 |
| WO | WO 2013/047347 A1 | 4/2013 |
| WO | WO 2013/047348 A1 | 4/2013 |
| WO | 2013/125496 A1 | 8/2013 |
| WO | WO 2013/115010 A1 | 8/2013 |
| WO | WO 2013/115011 A1 | 8/2013 |
| WO | WO 2013/125496 A1 | 8/2013 |
| WO | WO 201 3/15106 A1 | 10/2013 |
| WO | WO 2013/151067 A1 | 10/2013 |
| WO | WO 2013/151068 A1 | 10/2013 |

OTHER PUBLICATIONS

Office Action dated Jan. 22, 2016 in U.S. Appl. No. 14/225,743.
Office Action dated May 21, 2015 in U.S. Appl. No. 14/225,743.
AEROSIL, 300, Product information, Evonik Indurstries AG, Apr. 2014, 2 pages.
ULTRASIL 7000 GR, product information, Evonik Indurstries AG, Sep. 2014, 2 pages.
Kuraray Liquid Rubber, Liquid Isoprene Rubber (LIR), Liquid butadiene Rubber (LBR)2014, 7 pages.
Mayumi Hayashi, et al., "Development and Foresight of Solution SBR for Energy-Saving Tires", Sumitomo Chemical R&D Report, vol. 2011-I, 2011, 10 pages.
Opposition document filed against a related EP application No. 14161643.3 notified on Dec. 19, 2016.
U. Wenzel, "Characterization of an ultrahighmolecular polymethacrylate with a liquid crystalline side group in a dilute solution" (with a concise explanation), Jul. 5, 2000.

\* cited by examiner

PNEUMATIC TIRE

TECHNICAL FIELD

The present invention relates to a pneumatic tire.

BACKGROUND ART

An increasing concern for environmental problems these days leads to a higher demand for fuel efficient vehicles. Rubber compositions for automobile tires are also desired to have excellent fuel economy. There are, for example, conventional rubber compositions for automobile tires that contain a conjugated diene polymer such as polybutadiene or styrene-butadiene copolymers, a filler such as carbon black or silica, and oil or the like for ensuring flexibility.

Patent Literature 1 for example proposes a method for improving fuel economy. The method uses a diene rubber (modified rubber) modified with an organic silicon compound containing an amino group and an alkoxy group. While the use of the modified rubber enhances the reaction efficiency between silica and rubber (polymer) to improve fuel economy, it tends to increase Mooney viscosity so that processability can be deteriorated. It is thus difficult to improve both fuel economy and processability. Moreover, the modified rubber and silica are bound too densely so that rubber strength or abrasion resistance may be reduced.

Furthermore, since rubber compositions for automobile tires need to be excellent in wet-grip performance and handling stability for safety reasons, improved methods are needed which can achieve a good balance of high levels of these properties and fuel economy, processability, rubber strength, and abrasion resistance.

CITATION LIST

Patent Literature

Patent Literature 1: JP 2000-344955 A

SUMMARY OF INVENTION

Technical Problem

The present invention aims to solve the above problem and provide a pneumatic tire having high productivity and achieving a balanced improvement in fuel economy, rubber strength, abrasion resistance, wet-grip performance, and handling stability.

Solution to Problem

The present invention relates to a pneumatic tire, including a tread formed from a rubber composition, the rubber composition containing a rubber component in which, based on 100% by mass of the rubber component, an amount of a styrene-butadiene rubber is 15 to 90% by mass, an amount of a high-cis polybutadiene having a cis content of 95% by mass or more is 5 to 60% by mass, and an amount of a polyisoprene-based rubber is 0 to 70% by mass, the rubber composition containing, relative to 100 parts by mass of the rubber component, 10 to 150 parts by mass of a silica having a nitrogen adsorption specific surface area of 40 to 400 m²/g, and 1 to 50 parts by mass of a farnesene resin obtained by polymerizing farnesene.

The farnesene resin is preferably a farnesene homopolymer.

The homopolymer preferably has a glass transition temperature of −60° C. or lower.

The homopolymer preferably has a weight average molecular weight of 3,000 to 500,000.

The homopolymer preferably has a melt viscosity at 38° C. of 1,000 Pa·s or lower.

The farnesene resin is preferably a copolymer of farnesene and a vinyl monomer.

The vinyl monomer is preferably styrene.

The vinyl monomer is preferably butadiene.

The copolymer preferably has a farnesene/vinyl monomer ratio of 99/1 to 25/75 by mass.

The copolymer preferably has a weight average molecular weight of 3,000 to 500,000.

The copolymer preferably has a melt viscosity at 38° C. of 1,000 Pa·s or lower.

Preferably, the farnesene is prepared by culturing a microorganism using a carbon source derived from a saccharide.

The rubber composition preferably has a tan δ peak temperature of lower than −16° C.

Advantageous Effects of Invention

The pneumatic tire of the present invention includes a tread formed from a rubber composition that is prepared by adding to a specific rubber component predetermined amounts of a specific silica and a farnesene resin obtained by polymerizing farnesene. Such a tire can achieve a balanced improvement in fuel economy, rubber strength, abrasion resistance, wet-grip performance, and handling stability. Further, since the rubber composition provides good processability, the pneumatic tire can be produced with high productivity.

DESCRIPTION OF EMBODIMENTS

The pneumatic tire of the present invention includes a tread formed from a rubber composition that is prepared by adding to a specific rubber component predetermined amounts of a specific silica and a farnesene resin obtained by polymerizing farnesene. The addition of the farnesene resin as a softener to a composition containing the rubber component and the silica results in a more balanced improvement in processability, fuel economy, rubber strength, abrasion resistance, wet-grip performance, and handling stability as compared with when only oil is added.

The rubber component includes a styrene-butadiene rubber (SBR) and a high-cis polybutadiene (high-cis polybutadiene rubber) having a cis content of 95% by mass or more, and preferably 97% by mass or more, and optionally a polyisoprene-based rubber. The use of such components allows for a balanced improvement in processability, fuel economy, rubber strength, abrasion resistance, wet-grip performance, and handling stability.

Non-limiting examples of the SBR include those commonly used in the tire industry such as Nipol NS116R available from Zeon Corporation.

The amount of the SBR based on 100% by mass of the rubber component is 15% by mass or more, preferably 25% by mass or more, more preferably 35% by mass or more. If the amount is less than 15% by mass, wet-grip performance tends to be reduced. Also, the amount of the SBR is 90% by mass or less, preferably 80% by mass or less, more preferably 70% by mass or less, still more preferably 60% by mass or less. If the amount is more than 90% by mass, fuel economy tends to deteriorate.

The high-cis polybutadiene is not particularly limited as long as it is a polybutadiene rubber having a cis content of 95% by mass or more. Examples include those commonly used in the tire industry such as BR1220 available from Zeon Corporation, and BR 130B and BR150B available from Ube Industries, Ltd.

The cis content herein is calculated by infrared absorption spectrum analysis.

The amount of the high-cis polybutadiene based on 100% by mass of the rubber component is 5% by mass or more, preferably 10% by mass or more, more preferably 15% by mass or more. If the amount is less than 5% by mass, abrasion resistance tends to be reduced. Also, the amount of the high-cis polybutadiene is 60% by mass or less, preferably 50% by mass or less, more preferably 40% by mass or less. If the amount is more than 60% by mass, wet-grip performance tends to be reduced.

Examples of the polyisoprene-based rubber include natural rubber (NR) and polyisoprene rubber (IR). Non-limiting examples of the NR include those commonly used in the tire industry, such as SIR20, RSS#3, TSR20, deproteinized natural rubber (DPNR), highly purified natural rubber (HPNR), and epoxidized natural rubber (ENR). Similarly, IR may be one commonly used in the tire industry. NR is especially preferred because it allows the effect of the present invention to be more suitably achieved.

The amount of the polyisoprene-based rubber based on 100% by mass of the rubber component may be 0% by mass but is preferably more than 0% by mass, more preferably 10% by mass or more. The addition of the polyisoprene-based rubber not only enhances rubber strength, but also allows the rubber compound to readily come together during kneading, so that processability (productivity) can be improved. Also, the amount of the polyisoprene-based rubber is 70% by mass or less, preferably 50% by mass or less, more preferably 40% by mass or less. If the amount is more than 70% by mass, sufficient wet-grip performance may not be obtained.

According to the present invention, the specific amounts of SBR and high-cis polybutadiene are contained, and optionally the specific amount of polyisoprene-based rubber is added. This allows a balanced improvement in processability, fuel economy, rubber strength, abrasion resistance, wet-grip performance, and handling stability to be achieved.

Examples of materials that can be used in the rubber component, other than the SBR, high-cis polybutadiene, and polyisoprene-based rubber include butadiene-isoprene copolymer rubber, butyl rubber, ethylene-propylene copolymers, and ethylene-octene copolymers. These rubber materials may be used in combinations of two or more.

The rubber composition contains a farnesene resin. The term "farnesene resin" refers to a polymer obtained by polymerizing farnesene as a monomer component. There are isomers of farnesene, such as for example α-farnesene ((3E,7E)-3,7,11-trimethyl-1,3,6,10-dodecatetraene) and β-farnesene (7,11-dimethyl-3-methylene-1,6,10-dodecatriene).

A preferred farnesene is (E)-β-farnesene having the following structure:

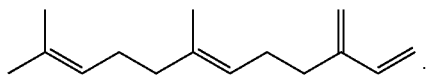

In the present invention, the addition of the farnesene resin as a softener can improve processability, fuel economy, rubber strength, abrasion resistance, wet-grip performance, and handling stability. The farnesene resin is preferably added in place of the conventionally used softeners such as oil. In such a case, the effect of the present invention can be more suitably achieved.

The farnesene resin may be a homopolymer of farnesene (farnesene homopolymer) or may be a copolymer of farnesene and a vinyl monomer (farnesene-vinyl monomer copolymer). Examples of vinyl monomers include aromatic vinyl compounds such as styrene, 2-methylstyrene, 3-methylstyrene, 4-methylstyrene, α-methylstyrene, 2,4-dimethylstyrene, 2,4-diisopropylstyrene, 4-tert-butylstyrene, 5-t-butyl-2-methylstyrene, vinylethylbenzene, divinylbenzene, trivinylbenzene, divinylnaphthalene, tert-butoxystyrene, vinylbenzyldimethylamine, (4-vinylbenzyl)dimethylaminoethyl ether, N,N-dimethylaminoethylstyrene, N,N-dimethylaminomethylstyrene, 2-ethylstyrene, 3-ethylstyrene, 4-ethylstyrene, 2-t-butylstyrene, 3-t-butylstyrene, 4-t-butylstyrene, vinylxylene, vinylnaphthalene, vinyltoluene, vinylpyridine, diphenylethylene, and tertiary amino group-containing diphenylethylene; and conjugated diene compounds such as butadiene and isoprene. Styrene and butadiene are especially preferred. In other words, the farnesene-vinyl monomer copolymer is preferably a copolymer of farnesene and styrene (farnesene-styrene copolymer) or a copolymer of farnesene and butadiene (farnesene-butadiene copolymer). The addition of the farnesene-styrene copolymer can enhance the effects of improving rubber strength, handling stability, wet-grip performance, and abrasion resistance. The addition of the farnesene-butadiene copolymer can enhance the effects of improving fuel economy and abrasion resistance.

The farnesene homopolymer preferably has a glass transition temperature (Tg) of −60° C. or lower, more preferably −70° C. or lower, but preferably −120° C. or higher, more preferably −110° C. or higher. Farnesene homopolymers having a glass transition temperature within the range mentioned above can be suitably used as softeners for tires.

For the same reason, the farnesene-styrene copolymer preferably has a Tg of −15° C. or lower, more preferably −30° C. or lower, but preferably −80° C. or higher, more preferably −70° C. or higher.

For the same reason, the farnesene-butadiene copolymer preferably has a Tg of −60° C. or lower, more preferably −70° C. or lower, but preferably −120° C. or higher, more preferably −110° C. or higher.

The Tg values are measured using a differential scanning calorimeter (Q200) available from TA Instruments Japan at a rate of temperature rise of 10° C./min in conformity with JIS K 7121:1987.

The farnesene homopolymer preferably has a weight average molecular weight (Mw) of 3,000 or higher, more preferably 5,000 or higher, still more preferably 8,000 or higher. If the Mw is lower than 3,000, handling stability and abrasion resistance tend to deteriorate. The Mw is also preferably 500,000 or lower, more preferably 300,000 or lower, still more preferably 150,000 or lower. If the Mw is higher than 500,000, processability or abrasion resistance tends to deteriorate.

The farnesene-vinyl monomer copolymer preferably has a Mw of 3,000 or higher, more preferably 5,000 or higher, still more preferably 8,000 or higher. If the Mw is lower than 3,000, handling stability tends to deteriorate. The Mw is also preferably 500,000 or lower, more preferably 300,000 or lower, still more preferably 150,000 or lower, particularly preferably 100,000 or lower. If the Mw is higher than 500,000, wet-grip performance tends to deteriorate.

Farnesene homopolymers and farnesene-vinyl monomer copolymers having a Mw within the respective ranges mentioned above are in the liquid state at room temperature and can be suitably used as softeners for tires.

The farnesene homopolymer preferably has a melt viscosity of 1,000 Pa·s or lower, more preferably 200 Pa·s or lower, but preferably 0.1 Pa·s or higher, more preferably 0.5 Pa·s or higher. Farnesene homopolymers having a melt viscosity within the range mentioned above can be suitably used as softeners for tires and are also excellent in bloom resistance.

For the same reason, the farnesene-vinyl monomer copolymer preferably has a melt viscosity of 1,000 Pa·s or lower, more preferably 650 Pa·s or lower, still more preferably 200 Pa·s or lower, but preferably 1 Pa·s or higher, more preferably 5 Pa·s or higher.

The melt viscosity values are measured at 38° C. using a Brookfield-type viscometer (available from Brookfield Engineering Labs. Inc.).

The farnesene homopolymer preferably has a farnesene content of 80% by mass or more, more preferably 90% by mass or more, based on 100% by mass of monomer components. The farnesene content may be 100% by mass.

The farnesene-vinyl monomer copolymer preferably has a combined content of farnesene and vinyl monomer of 80% by mass or more, more preferably 90% by mass or more, based on 100% by mass of monomer components. The combined content may be 100% by mass. Moreover, the farnesene/vinyl monomer copolymerization ratio, farnesene: vinyl monomer, is preferably 99/1 to 25/75, more preferably 80/20 to 40/60 by mass.

The farnesene resin may be synthesized by known methods. For example, in the case of the synthesis by anion polymerization, hexane, farnesene, and sec-butyllithium, and optionally a vinyl monomer are charged into a sufficiently nitrogen-purged, pressure-resistant vessel; the mixture is then warmed and stirred for several hours; and the resulting polymerization solution is quenched and then dried in vacuo, whereby a liquid farnesene resin can be obtained.

The procedure for polymerization in the preparation of the farnesene homopolymer is not particularly limited. For example, all the monomers may be polymerized at once, or the monomers may be sequentially added and polymerized. The procedure for copolymerization in the preparation of the farnesene-vinyl monomer copolymer is also not particularly limited. For example, all the monomers may be random-copolymerized at once; or specific monomer(s) (for example, farnesene monomer alone, or butadiene monomer alone) may previously be polymerized before the remaining monomer(s) is added and copolymerized therewith; or each specific monomer may previously be polymerized before the resulting polymers are block-copolymerized.

The farnesene used in the farnesene resin may be prepared from petroleum resources by chemical synthesis, or may be extracted from insects such as Aphididae or plants such as apples. The farnesene is preferably prepared by culturing a microorganism using a carbon source derived from a saccharide. The farnesene resin can be efficiently prepared from such farnesene.

The saccharide may be any of monosaccharides, disaccharides, and polysaccharides, or may be a combination thereof. Examples of monosaccharides include glucose, galactose, mannose, fructose, and ribose. Examples of disaccharides include sucrose, lactose, maltose, trehalose, and cellobiose. Examples of polysaccharides include starch, glycogen, cellulose, and chitin.

Saccharides suitable for preparing farnesene can be obtained from a wide variety of materials, such as sugar cane, bagasse, *Miscanthus*, sugar beet, sorghum, grain sorghum, switchgrass, barley, hemp, kenaf, potato, sweet potato, cassava, sunflower, fruits, molasses, whey, skim milk, corn, straw, grain, wheat, wood, paper, wheat straw, and cotton. Cellulosic wastes and other biomass materials may also be used. Preferred among these are plants of the genus *Saccharum* such as sugar cane (*Saccharum officinarum*), with sugar cane being more preferred.

The microorganism may be any microorganism capable of producing farnesene through culture. Examples include eukaryotes, bacteria, and archaebacteria. Examples of eukaryotes include yeast and plants.

The microorganism may be a transformant. The transformant can be obtained by introducing a foreign gene into a host microorganism. The foreign gene is preferably, but not limited to, a foreign gene involved in the production of farnesene because it can further improve farnesene production efficiency.

The conditions for culture are not particularly limited as long as they allow the microorganism to produce farnesene. The medium used for culturing the microorganism may be any medium commonly used for culturing microorganisms. Specific examples include KB medium and LB medium in the case of bacteria; YM medium, KY medium, F101 medium, YPD medium, and YPAD medium in the case of yeast; and basal media such as White medium, Heller medium, SH medium (Schenk and Hildebrandt medium), MS medium (Murashige and Skoog medium), LS medium (Linsmaier and Skoog medium), Gamborg medium, B5 medium, MB medium, and WP medium (for woody plants) in the case of plants.

The culture temperature is preferably 0° C. to 50° C., more preferably 10° C. to 40° C., still more preferably 20° C. to 35° C., depending on the type of microorganism. The pH is preferably 3 to 11, more preferably 4 to 10, still more preferably 5 to 9. Moreover, the microorganism may be cultured either anaerobically or aerobically depending on its type.

The microorganism may be cultured in a batch process, or in a continuous process using a bioreactor. Specific examples of the culturing method include shaking culture and rotary culture. Farnesene may be accumulated in the cells of the microorganism, or may be produced and accumulated in the culture supernatant.

When farnesene is acquired from the cultured microorganism, after the microorganism is collected by centrifugation and then disrupted, farnesene can be extracted from the disrupted solution with a solvent such as 1-butanol. Such solvent extraction may appropriately be combined with a known purification process such as chromatography. The microorganism is preferably disrupted at a low temperature, for example at 4° C., in order to prevent modification and breakdown of farnesene. The microorganism may be physically disrupted using glass beads, for example.

When farnesene is acquired from the culture supernatant, after the culture is centrifuged to remove the cells, farnesene may be extracted from the resulting supernatant with a solvent such as 1-butanol.

Farnesene resins formed from such microorganism-derived farnesenes are available from the market. Examples of such farnesene homopolymers include KB-101 and KB-107 both available from Kuraray Co., Ltd. Examples of such farnesene-styrene copolymers include FSR-221, FSR-242, FSR-251, and FSR-262, all available from Kuraray Co., Ltd.

Examples of such farnesene-butadiene copolymers include FBR-746, FB-823, and FB-884, all available from Kuraray Co., Ltd.

The amount of the farnesene resin relative to 100 parts by mass of the rubber component is 1 part by mass or more, preferably 3 parts by mass or more, more preferably 5 parts by mass or more. If the amount is less than 1 part by mass, the farnesene resin tends not to sufficiently exert its property-improving effect. Also, the amount of the farnesene resin is 50 parts by mass or less, preferably 40 parts by mass or less, more preferably 30 parts by mass or less, still more preferably 20 parts by mass or less. More than 50 parts by mass of farnesene resin tends to result in deterioration of fuel economy, wet-grip performance, handling stability, or abrasion resistance, and especially handling stability or abrasion resistance.

The rubber composition contains a silica. The silica is not particularly limited as long as it has a nitrogen adsorption specific surface area of 40 to 400 m$^2$/g. Examples of the silica include dry silica (anhydrous silica) and wet silica (hydrous silica). Wet silica is preferred as it has more silanol groups.

The silica has a nitrogen adsorption specific surface area (N$_2$SA) of 40 m$^2$/g or greater, preferably 50 m$^2$/g or greater, more preferably 60 m$^2$/g or greater, still more preferably 100 m$^2$/g or greater. Silica with an N$_2$SA of smaller than 40 m$^2$/g tends to have a small reinforcing effect, resulting in a reduction in abrasion resistance, rubber strength, handling stability or the like. Also, the N$_2$SA is 400 m$^2$/g or smaller, preferably 360 m$^2$/g or smaller, more preferably 300 m$^2$/g or smaller, still more preferably 200 m$^2$/g or smaller. Silica with an N$_2$SA of greater than 400 m$^2$/g tends not to readily disperse, resulting in deterioration of fuel economy or processability.

The N$_2$SA of silica is determined by the BET method in conformity with ASTM D3037-81.

The amount of the silica relative to 100 parts by mass of the rubber component is 10 parts by mass or more, preferably 30 parts by mass or more, more preferably 45 parts by mass or more. If the amount is less than 10 parts by mass, the silica tends to insufficiently exert its effect, resulting in a reduction in abrasion resistance, rubber strength, wet-grip performance or the like. Also, the amount of the silica is 150 parts by mass or less, preferably 100 parts by mass or less. If the amount is more than 150 parts by mass, processability tends to deteriorate.

The rubber composition preferably contains a silane coupling agent. This can enhance the effects of improving the properties. Examples of other silane coupling agents include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl) tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazole tetrasulfide, 3-triethoxysilylpropylbenzothiazolyltetrasulfide, 3-triethoxysilylpropylmethacrylate monosulfide, 3-trimethoxysilylpropylmethacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, and dimethoxymethylsilylpropylbenzothiazole tetrasulfide. In view of the reinforcement-improving effect and the like, bis(3-triethoxysilylpropyl)tetrasulfide is preferred among these. These silane coupling agents may be used alone or in combinations of two or more.

The amount of the silane coupling agent relative to 100 parts by mass of silica is preferably 0.5 parts by mass or more, more preferably 3 parts by mass or more. If the amount is less than 0.5 parts by mass, the viscosity of the unvulcanized rubber composition may be too high to ensure good processability. Also, the amount of the silane coupling agent is preferably 20 parts by mass or less, more preferably 10 parts by mass or less. If the amount is more than 20 parts by mass, rubber strength or abrasion resistance tends to be reduced.

Known additives may be used. Examples include vulcanizing agents such as sulfur; vulcanization accelerators such as thiazole vulcanization accelerators, thiuram vulcanization accelerators, sulfenamide vulcanization accelerators, and guanidine vulcanization accelerators; vulcanization activators such as stearic acid and zinc oxide; organic peroxides; fillers such as carbon black, calcium carbonate, talc, alumina, clay, aluminum hydroxide, and mica; softeners such as oil; and antioxidants.

Examples of the carbon black include furnace black (furnace carbon black) such as SAF, ISAF, HAF, MAF, FEF, SRF, GPF, APF, FF, CF, SCF, and ECF; acetylene black (acetylene carbon black); thermal black (thermal carbon black) such as FT and MT; channel black (channel carbon black) such as EPC, MPC, and CC; and graphite. These may be used alone or in combinations of two or more.

The carbon black typically has a nitrogen adsorption specific surface area (N$_2$SA) of 5 to 200 m$^2$/g. The lower limit of the N$_2$SA is preferably 50 m$^2$/g, more preferably 80 m$^2$/g, while the upper limit thereof is preferably 150 m$^2$/g, more preferably 120 m$^2$/g. Moreover, the dibutyl phthalate (DBP) absorption of the carbon black is typically 5 to 300 ml/100 g. Preferably, the lower limit thereof is 80 ml/100 g, while the upper limit is 180 ml/100 g. Carbon black with an N$_2$SA or DBP absorption lower than the lower limit of the range mentioned above tends to have a small reinforcing effect, resulting in reduced abrasion resistance, rubber strength, or handling stability. Carbon black with an N$_2$SA or DBP absorption higher than the upper limit of the range mentioned above tends to poorly disperse and increase hysteresis loss, resulting in lower fuel economy or processability. The nitrogen adsorption specific surface area is determined in conformity with ASTM D4820-93. The DBP absorption is determined in conformity with ASTM D2414-93. Examples of commercial products include SEAST 6, SEAST 7HM, and SEAST KH, all available from Tokai Carbon Co., Ltd, and CK3 and Special Black 4A both available from Degussa.

The amount of the carbon black relative to 100 parts by mass of the rubber component is preferably 1 part by mass or more, more preferably 3 parts by mass or more. If the amount is less than 1 part by mass, sufficient reinforcing properties may not be obtained. The amount of the carbon black is also preferably 60 parts by mass or less, more preferably 30 parts by mass or less, still more preferably 15 parts by mass or less, particularly preferably 10 parts by mass or less. If the amount is more than 60 parts by mass, fuel economy tends to deteriorate.

Examples of the oil include aromatic oil (viscosity-gravity constant (VGC): 0.900 to 1.049), naphthenic oil (VGC: 0.850 to 0.899), and paraffinic oil (VGC: 0.790 to 0.849). The oil preferably has a polycyclic aromatic content of less than 3% by mass, more preferably less than 1% by mass. The polycyclic aromatic content is measured in conformity with the Institute of Petroleum (IP, U.K.) 346/92 method. Moreover, the oil preferably has an aromatic content (CA) of 20% by mass or more. These oils may be used in combinations of two or more.

As described above, the farnesene resin is preferably added in place of a part or all of the conventionally used softeners such as oil. The amount of the farnesene resin based on 100% by mass of softeners is preferably 5% by mass or more, more preferably 10% by mass or more, still more preferably 15% by mass or more, particularly preferably 25% by mass or more, most preferably 35% by mass or more. The upper limit may be 100% by mass but is preferably 80% by mass or less, more preferably 60% by mass or less. Moreover, the total amount of softeners, including the amount of the farnesene resin, relative to 100 parts by mass of the rubber component is preferably 1 to 100 parts by mass, more preferably 5 to 60 parts by mass, still more preferably 10 to 30 parts by mass.

Examples of the vulcanization accelerator include thiazole vulcanization accelerators such as 2-mercaptobenzothiazole, dibenzothiazyldisulfide, and N-cyclohexyl-2-benzothiazylsulfenamide; thiuram vulcanization accelerators such as tetramethylthiuram monosulfide and tetramethylthiuram disulfide; sulfenamide vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, diorthotolylguanidine, and orthotolylbiguanidine. The amount thereof relative to 100 parts by mass of the rubber component is preferably 0.1 to 5 parts by mass, more preferably 0.2 to 3 parts by mass.

The rubber composition may be prepared by known methods, such as, for example, by kneading the components using a known mixer such as a roll mill or a Banbury mixer. The rubber composition can be suitably used in treads of tires.

Regarding the kneading conditions when additives other than vulcanizing agents and vulcanization accelerators are added, the kneading temperature is typically 50° C. to 200° C., preferably 80° C. to 190° C., and the kneading time is typically 30 seconds to 30 minutes, preferably 1 to 30 minutes.

When vulcanizing agents or vulcanization accelerators are added, the kneading temperature is typically 100° C. or lower, preferably in the range from room temperature to 80° C. Moreover, the composition containing a vulcanizing agent and/or a vulcanization accelerator is typically vulcanized, for example press-vulcanized, before use. The vulcanization temperature is typically 120° C. to 200° C., preferably 140° C. to 180° C.

The rubber composition (after vulcanization) preferably has a tan δ peak temperature of lower than −16° C., more preferably −18° C. or lower. The rubber composition having a tan δ peak temperature of −16° C. or higher has a higher temperature dependence and thus may be less likely to achieve sufficient grip performance over a wide temperature range. The tan δ peak temperature is also preferably −60° C. or higher, more preferably −50° C. or higher. The rubber composition having a tan δ peak temperature of lower than −60° C. may be less likely to achieve sufficient wet-grip performance.

The tan δ peak temperature is determined by the method described later in the examples.

The pneumatic tire of the present invention may be produced using the above rubber composition by conventional methods. Specifically, the rubber composition containing additives as appropriate, before vulcanization, is extruded into the shape of a tread of a tire, formed on a tire building machine in a usual manner, and assembled with other tire components to build an unvulcanized tire. The unvulcanized tire is heated and pressurized in a vulcanizer, whereby a pneumatic tire of the present invention can be produced.

The pneumatic tire of the present invention can be suitably used as a tire for passenger vehicles.

EXAMPLES

The present invention will be specifically described with reference to, but not limited to, examples.

The chemicals used in the examples and comparative examples are listed below.

Styrene-butadiene rubber (SBR): Nipol NS116R available from Zeon Corporation.

Natural rubber: TSR20

High-cis polybutadiene: UBEPOL BR150B (cis content: 97% by mass) available from Ube Industries, Ltd.

Silica: ZEOSIL 1165MP ($N_2SA$: 160 $m^2/g$) available from Rhodia Japan

Silane coupling agent: Si69 (bis(3-triethoxysilylpropyl) tetrasulfide) available from Degussa Carbon black: DIABLACK N339 ($N_2SA$: 96 $m^2/g$, DBP absorption: 124 ml/100 g) available from Mitsubishi Chemical Corp.

Oil: X-140 (aromatic oil) available from Japan Energy Corp.

Farnesene homopolymer 1: KB-101 (Mw: 10,000, melt viscosity: 0.7 Pa·s, Tg: −72° C.) available from Kuraray Co., Ltd.

Farnesene homopolymer 2: KB-107 (Mw: 135,000, melt viscosity: 69 Pa·s, Tg: −71° C.) available from Kuraray Co., Ltd.

Farnesene-styrene copolymer 1: FSR-221 (Mw: 10,000, copolymerization ratio by mass: farnesene/styrene=77/23, melt viscosity: 5.7 Pa·s, Tg: −54° C.) available from Kuraray Co., Ltd.

Farnesene-styrene copolymer 2: FSR-242 (Mw: 10,000, copolymerization ratio by mass: farnesene/styrene=60/40, melt viscosity: 59.2 Pa·s, Tg: −35° C.) available from Kuraray Co., Ltd.

Farnesene-butadiene copolymer 1: FBR-746 (Mw: 100,000, copolymerization ratio by mass: farnesene/butadiene=60/40, melt viscosity: 603 Pa·s, Tg: −78° C.) available from Kuraray Co., Ltd.

Farnesene-butadiene copolymer 2: FB-823 (Mw: 50,000, copolymerization ratio by mass: farnesene/butadiene=80/20, melt viscosity: 13 Pa·s, Tg=−78° C.) available from Kuraray Co., Ltd.

Antioxidant: Antigene 3C available from Sumitomo Chemical Co., Ltd.

Stearic acid: stearic acid beads "Tsubaki" available from NOF Corporation

Zinc oxide: zinc oxide #1 available from Mitsui Mining & Smelting Co., Ltd.

Wax: SUNNOC N available from Ouchi Shinko Chemical Industrial Co., Ltd.

Sulfur: powdered sulfur available from Tsurumi Chemical Industry Co., Ltd.

Vulcanization accelerator 1: SOXINOL CZ available from Sumitomo Chemical Co., Ltd.

Vulcanization accelerator 2: SOXINOL D available from Sumitomo Chemical Co., Ltd.

Examples and Comparative Examples

According to the formulations shown in Tables 1 to 3, the materials other than the sulfur and vulcanization accelerators were kneaded for five minutes at 150° C. using a 1.7-L Banbury mixer available from Kobe Steel, Ltd. to give a kneaded mixture. The sulfur and vulcanization accelerators were then added to the kneaded mixture, and the resulting mixture was kneaded for five minutes at 80° C. using an open roll mill, thereby providing an unvulcanized rubber composition. The unvulcanized rubber composition was press-vulcanized using a 0.5 mm thick mold for 20 minutes at 170° C. to prepare a vulcanized rubber composition. Separately, the unvulcanized rubber composition was formed into a tread shape and assembled with other tire components on a tire building machine to build an unvulcanized tire. The unvulcanized tire was vulcanized for 12 minutes at 170° C., thereby providing a test tire (size: 195/65R15).

The unvulcanized rubber compositions, vulcanized rubber compositions, and test tires thus prepared were evaluated as follows. Tables 1 to 3 show the results.

<Test Items and Test Methods>
<Processability Index>

The Mooney viscosity ($ML_{1+4}$ at 130° C.) of each unvulcanized rubber composition was determined in conformity with JIS K 6300-1:2001 "Rubber, unvulcanized—Physical property—Part 1: Determination of Mooney viscosity and pre-vulcanization characteristics with Mooney viscometer" using a Mooney viscosity tester, which was preheated for 1 minute to 130° C., a small rotor was rotated under this temperature, and after a lapse of four minutes, the Mooney viscosity ($ML_{1+4}$ at 130° C.) was measured and expressed as an index using the equation below. A higher index indicates a lower Mooney viscosity and better processability (kneading processability), which in turn indicates higher tire productivity.

(Processability index)=(Mooney viscosity of Comparative Example 1)/(Mooney viscosity of each formulation)×100

<Fuel Economy Index>

The tan δ of each vulcanized rubber composition was measured using a spectrometer available from Ueshima Seisakusho Co., Ltd. at a dynamic strain amplitude of 1%, a frequency of 10 Hz, and a temperature of 50° C., and expressed as an index using the equation below. A higher index indicates a lower rolling resistance, which in turn indicates better fuel economy.

(Fuel economy index)=(tan δ of Comparative Example 1)/(tan δ of each formulation)×100

<Tan δ Peak Temperature>

The tan δ of each vulcanized rubber composition was measured using a spectrometer produced by Ueshima Seisakusho Co., Ltd. at a dynamic strain amplitude of 1%, a frequency of 10 Hz, and a rate of temperature rise of 2° C./min over a temperature range of −80° C. to 80° C. The temperature at which the tan δ peaked was taken as the tan δ peak temperature.

<Rubber Strength Index>

A tensile test was performed in conformity with JIS K 6251:2010 to measure elongation at break. The results were expressed as an index using the equation below. A higher index indicates higher rubber strength (elongation at break).

(Rubber strength index)=(Elongation at break of each formulation)/(Elongation at break of Comparative Example 1)×100

(Abrasion Resistance Index)

The volume loss of each vulcanized rubber composition was measured using a Laboratory Abrasion and Skid Tester (LAT tester) under a load of 50 N at a speed of 20 km/h and a slip angle of 5°, and expressed as an index using the equation below. A higher index indicates better abrasion resistance.

(Abrasion resistance index)=(Volume loss of Comparative Example 1)/(Volume loss of each formulation)×100

<Wet-Grip Performance Index>

Each set of test tires were mounted on all the wheels of a vehicle (front-engine, front-wheel-drive car of 2,000 cc displacement made in Japan), and the braking distance was determined from an initial speed of 100 km/h on a wet asphalt road and expressed as an index using the equation below. A higher index indicates better wet-grip performance.

(Wet-grip performance index)=(Braking distance of Comparative Example 1)/(Braking distance of each formulation)×100

<Handling Stability>

Each set of test tires were mounted on all the wheels of a front-engine, front-wheel-drive car of 2,000 cc displacement made in Japan. A driver drove the car on a test course (temperature on snow: −10° C. to −2° C.) of Sumitomo Rubber Industries, Ltd. in Nayoro, Hokkaido, Japan. The handling stability was subjectively evaluated by the driver and scored on a scale of 1 to 10, with 10 being the best. The scores are relative to Comparative Example 1 given a score of 6. A higher score indicates better handling stability.

TABLE 1

| | | Example | | | | | | Comparative Example | | | | |
|---|---|---|---|---|---|---|---|---|---|---|---|---|
| | | 1 | 2 | 3 | 4 | 5 | 6 | 1 | 2 | 3 | 4 | 5 |
| Formulation (part(s) by mass) | SBR | 45 | 45 | 50 | 50 | 50 | 50 | 45 | 45 | 45 | 45 | 45 |
| | Natural rubber | 25 | 25 | 25 | 25 | 20 | 20 | 25 | 25 | 25 | 25 | 25 |
| | High-cis polybutadiene | 30 | 30 | 25 | 25 | 30 | 30 | 30 | 30 | 30 | 30 | 30 |
| | Silica | 75 | 75 | 75 | 75 | 75 | 75 | 75 | 75 | 75 | 75 | 75 |
| | Silane coupling agent | 6 | 6 | 6 | 6 | 6 | 6 | 6 | 6 | 6 | 6 | 6 |
| | Carbon black | 5 | 5 | 5 | 5 | 5 | 5 | 5 | 5 | 5 | 5 | 5 |
| | Oil | 10 | 10 | 10 | 10 | 10 | 10 | 20 | 19.8 | 19.8 | — | — |
| | Farnesene homopolymer 1 | 10 | — | 10 | — | 10 | — | — | 0.2 | — | 55 | — |
| | Farnesene homopolymer 2 | — | 10 | — | 10 | — | 10 | — | — | 0.2 | — | 55 |
| | Antioxidant | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 |
| Evaluation | Processability index | 105 | 106 | 108 | 105 | 103 | 102 | 100 | 101 | 100 | 115 | 110 |
| | Fuel economy index | 125 | 129 | 108 | 113 | 110 | 118 | 100 | 100 | 103 | 98 | 105 |
| | tanδ peak temperature | −22 | −22 | −18 | −18 | −20 | −20 | −20 | −20 | −20 | −32 | −32 |
| | Rubber strength index | 103 | 104 | 115 | 123 | 110 | 115 | 100 | 101 | 100 | 102 | 103 |
| | Abrasion resistance index | 105 | 104 | 103 | 101 | 105 | 103 | 100 | 100 | 100 | 65 | 60 |
| | Wet-grip performance index | 110 | 107 | 122 | 120 | 117 | 115 | 100 | 100 | 99 | 105 | 102 |
| | Handling stability | 6.25 | 6.25 | 7 | 7 | 6.75 | 6.75 | 6 | 6 | 6 | 4.5 | 5 |

TABLE 2

| | | Example | | | | | | Comparative Example | | | | |
|---|---|---|---|---|---|---|---|---|---|---|---|---|
| | | 7 | 8 | 9 | 10 | 11 | 12 | 1 | 6 | 7 | 8 | 9 |
| Formulation (part(s) by mass) | SBR | 45 | 45 | 50 | 50 | 50 | 50 | 45 | 45 | 45 | 45 | 45 |
| | Natural rubber | 25 | 25 | 25 | 25 | 20 | 20 | 25 | 25 | 25 | 25 | 25 |
| | High-cis polybutadiene | 30 | 30 | 25 | 25 | 30 | 30 | 30 | 30 | 30 | 30 | 30 |
| | Silica | 75 | 75 | 75 | 75 | 75 | 75 | 75 | 75 | 75 | 75 | 75 |
| | Silane coupling agent | 6 | 6 | 6 | 6 | 6 | 6 | 6 | 6 | 6 | 6 | 6 |
| | Carbon black | 5 | 5 | 5 | 5 | 5 | 5 | 5 | 5 | 5 | 5 | 5 |
| | Oil | 10 | 10 | 10 | 10 | 10 | 10 | 20 | 19.8 | 19.8 | — | — |
| | Farnesene-styrene copolymer 1 | 10 | — | 10 | — | 10 | — | — | 0.2 | — | 55 | — |
| | Farnesene-styrene copolymer 2 | — | 10 | — | 10 | — | 10 | — | — | 0.2 | — | 55 |
| | Antioxidant | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 |
| Evaluation | Processability index | 104 | 111 | 107 | 110 | 102 | 108 | 100 | 100 | 100 | 112 | 117 |
| | Fuel economy index | 125 | 120 | 108 | 102 | 110 | 103 | 100 | 100 | 100 | 100 | 91 |
| | tanδ peak temperature | −20 | −19 | −18 | −17 | −20 | −19 | −20 | −20 | −20 | −30 | −27 |
| | Rubber strength index | 105 | 109 | 118 | 129 | 114 | 120 | 100 | 101 | 102 | 105 | 107 |
| | Abrasion resistance index | 108 | 106 | 107 | 103 | 109 | 105 | 100 | 100 | 100 | 70 | 60 |
| | Wet-grip performance index | 115 | 112 | 127 | 125 | 120 | 120 | 100 | 100 | 100 | 99 | 102 |
| | Handling stability | 6.5 | 6.5 | 7 | 7 | 7 | 7 | 6 | 6 | 6 | 5.25 | 5.5 |

TABLE 3

| | | Example | | | | | | Comparative Example | | | | |
|---|---|---|---|---|---|---|---|---|---|---|---|---|
| | | 13 | 14 | 15 | 16 | 17 | 18 | 1 | 10 | 11 | 12 | 13 |
| Formulation (part(s) by mass) | SBR | 45 | 45 | 50 | 50 | 50 | 50 | 45 | 45 | 45 | 45 | 45 |
| | Natural rubber | 25 | 25 | 25 | 25 | 20 | 20 | 25 | 25 | 25 | 25 | 25 |
| | High-cis polybutadiene | 30 | 30 | 25 | 25 | 30 | 30 | 30 | 30 | 30 | 30 | 30 |
| | Silica | 75 | 75 | 75 | 75 | 75 | 75 | 75 | 75 | 75 | 75 | 75 |
| | Silane coupling agent | 6 | 6 | 6 | 6 | 6 | 6 | 6 | 6 | 6 | 6 | 6 |
| | Carbon black | 5 | 5 | 5 | 5 | 5 | 5 | 5 | 5 | 5 | 5 | 5 |
| | Oil | 10 | 10 | 10 | 10 | 10 | 10 | 20 | 19.8 | 19.8 | — | — |
| | Farnesene-butadiene copolymer 1 | 10 | — | 10 | — | 10 | — | — | 0.2 | — | 55 | — |
| | Farnesene-butadiene copolymer 2 | — | 10 | — | 10 | — | 10 | — | — | 0.2 | — | 55 |
| | Antioxidant | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 |
| Evaluation | Processability index | 102 | 106 | 105 | 105 | 100 | 102 | 100 | 98 | 99 | 110 | 115 |
| | Fuel economy index | 128 | 125 | 111 | 107 | 113 | 108 | 100 | 101 | 103 | 102 | 105 |
| | tanδ peak temperature | −24 | −23 | −20 | −19 | −22 | −21 | −20 | −20 | −20 | −38 | −36 |
| | Rubber strength index | 103 | 104 | 115 | 123 | 110 | 115 | 100 | 101 | 104 | 102 | 103 |
| | Abrasion resistance index | 110 | 107 | 108 | 104 | 110 | 107 | 100 | 100 | 100 | 72 | 64 |
| | Wet-grip performance index | 108 | 106 | 120 | 119 | 115 | 114 | 100 | 99 | 100 | 97 | 99 |
| | Handling stability | 6.25 | 6.25 | 7 | 7 | 6.75 | 6.75 | 6 | 6 | 6 | 4.25 | 4.75 |

Tables 1 to 3 demonstrate that, in the examples using predetermined amounts of specific rubber component, specific silica, and farnesene resin, a balanced improvement in processability, fuel economy, rubber strength, abrasion resistance, wet-grip performance, and handling stability was achieved, and pneumatic tires achieving a balanced improvement in fuel economy, rubber strength, abrasion resistance, wet-grip performance, and handling stability could be produced with high productivity.

The invention claimed is:
1. A pneumatic tire, comprising:
a tread formed from a rubber composition,
wherein the rubber composition comprises a rubber component in which, based on 100% by mass of the rubber component, an amount of a styrene-butadiene rubber is 15 to 80% by mass, an amount of a high-cis polybutadiene having a cis content of 95% by mass or more is 5 to 60% by mass, and an amount of a polyisoprene-based rubber is 10 to 70% by mass, and the rubber composition comprises, relative to 100 parts by mass of the rubber component, 10 to 150 parts by mass of a silica having a nitrogen adsorption specific surface area of 40 to 400 m$^2$/g, and 1 to 50 parts by mass of a farnesene resin which is a copolymer obtained by polymerizing monomers consisting of farnesene and butadiene, and the rubber composition comprises the farnesene resin in an amount such that the rubber composition enhances a fuel economy index, an abrasion resistance index, a wet-grip performance index, and a handling stability score in the pneumatic tire with respect to a pneumatic tire comprising a tread formed from a same rubber composition except an amount of the farnesene resin.

2. The pneumatic tire according to claim 1, wherein the copolymer of the farnesene resin has a farnesene/butadiene ratio of 99/1 to 25/75 by mass.

3. The pneumatic tire according to claim 1, wherein the copolymer of the farnesene resin has a weight average molecular weight of 3,000 to 500,000.

4. The pneumatic tire according to claim 1, wherein the copolymer of the farnesene resin has a melt viscosity at 38° C. of 1,000 Pa·s or lower.

5. The pneumatic tire according to claim 1, wherein the farnesene is prepared by a process comprising culturing a microorganism using a carbon source derived from a saccharide.

6. The pneumatic tire according to claim 1, wherein the rubber composition has a tan δ peak temperature of lower than −16° C.

7. The pneumatic tire according to claim 1, wherein the high-cis polybutadiene in the rubber component has the cis content of 97% by mass or more.

8. The pneumatic tire according to claim 1, wherein, based on 100% by mass of the rubber component, the amount of the styrene-butadiene rubber is 25 to 80% by mass, the amount of the high-cis polybutadiene is 10 to 50% by mass, and the amount of the polyisoprene-based rubber is 10 to 50% by mass.

9. The pneumatic tire according to claim 1, wherein, based on 100% by mass of the rubber component, the amount of the styrene-butadiene rubber is 35 to 70% by mass, the amount of the high-cis polybutadiene is 15 to 40% by mass, and the amount of the polyisoprene-based rubber is 10 to 40% by mass.

10. The pneumatic tire according to claim 1, wherein the polyisoprene-based rubber comprises at least one of natural rubber and polyisoprene rubber.

11. The pneumatic tire according to claim 1, wherein the farnesene resin has a glass transition temperature of from −120° C. to −60° C.

12. The pneumatic tire according to claim 1, wherein the farnesene resin has a farnesene/butadiene ratio of 80/20 to 40/60 by mass.

13. The pneumatic tire according to claim 1, wherein the rubber composition comprises, relative to 100 parts by mass of the rubber component, 30 to 100 parts by mass of the silica.

14. The pneumatic tire according to claim 1, wherein the rubber composition comprises the silica and the farnesene resin in amounts such that the rubber composition enhances a rubber strength index in the pneumatic tire with respect to a pneumatic tire comprising a tread formed from a same rubber composition except an amount of the farnesene resin.

15. The pneumatic tire according to claim 1, wherein the rubber composition comprises, relative to 100 parts by mass of the rubber component, 3 to 40 parts by mass of the farnesene resin.

16. The pneumatic tire according to claim 1, wherein the rubber composition comprises, relative to 100 parts by mass of the rubber component, 5 to 30 parts by mass of the farnesene resin.

17. The pneumatic tire according to claim 1, wherein the rubber composition comprises, relative to 100 parts by mass of the rubber component, 30 to 100 parts by mass of the silica and 3 to 40 parts by mass of the farnesene resin.

18. The pneumatic tire according to claim 1, wherein the rubber composition comprises the silica and the farnesene resin such that the pneumatic tire achieves the fuel economy index in a range of 107 to 128, the abrasion resistance index in a range of 104 to 110 and the wet-grip performance index in a range of 106 to 120.

19. The pneumatic tire according to claim 1, wherein the farnesene resin has a weight average molecular weight of 5,000 to 300,000.

* * * * *